United States Patent [19]

Junker et al.

[11] Patent Number: 4,746,428

[45] Date of Patent: May 24, 1988

[54] FILTER PLATE

[75] Inventors: Werner Junker, Illerkirchberg; Franz Heckl, Senden, both of Fed. Rep. of Germany

[73] Assignee: Lenser Verwaltungs-GmbH, Senden, Fed. Rep. of Germany

[21] Appl. No.: 928,645

[22] Filed: Nov. 5, 1986

Related U.S. Application Data

[63] Continuation of Ser. No. 722,261, Apr. 11, 1985, abandoned.

[30] Foreign Application Priority Data

Apr. 17, 1984 [DE] Fed. Rep. of Germany ....... 3414550

[51] Int. Cl.$^4$ ............................................. B01D 25/12
[52] U.S. Cl. ..................................... 210/230; 100/194; 100/211; 210/231
[58] Field of Search ............... 100/194, 199, 204, 211, 100/295; 210/224–231, 232

[56] References Cited

U.S. PATENT DOCUMENTS

| | | | |
|---|---|---|---|
| 3,656,622 | 4/1972 | Heimbach et al. | 210/231 |
| 3,888,769 | 6/1975 | Schotten et al. | 210/231 X |
| 3,926,811 | 12/1975 | Ramsteck | 210/231 |
| 3,931,014 | 1/1976 | Heimbach et al. | 210/231 |
| 4,166,035 | 8/1979 | Ramsteck | 210/231 |
| 4,508,623 | 4/1983 | Heckl et al. | 210/231 X |

FOREIGN PATENT DOCUMENTS 3220487 12/1983 Fed. Rep. of Germany .

Primary Examiner—Peter Hruskoci
Assistant Examiner—W. Gary Jones
Attorney, Agent, or Firm—Karl F. Ross; Herbert Dubno

[57] ABSTRACT

A filter wall constructed separtely from the frame member is clamped in a clamping slot, to which toward the outside edge of the filter plate a widened sealing slot in a shoulder of the support is connected. A projecting edge of the filter wall extends into the latter slot with the shoulder overlapping, the filter wall having an annular flange directed to the outside. The seal is arranged in the sealing slot and has a U-shaped cross section with two arms extending inwardly, whose arms enclose and seal both sides of the annular flange and which seals the support on one side and the frame member on the other side. The spacing between the seal and the joint is sufficient that upon release of the closing pressure of the filter press, without disengaging it, the frame can be moved sufficiently far from the support that the pressurizable chamber is unsealed at the seal in the sealing slot.

3 Claims, 2 Drawing Sheets

FILTER PLATE

This is a continuation of co-pending application Ser. No 722,261 filed on Apr. 11, 1985 now abandoned.

FIELD OF THE INVENTION

Our invention relates to filter plates for filter presses, in which several filter plates are clamped together facing each other and with filter cloth sandwiched between them.

BACKGROUND OF THE INVENTION

Known filter plates are clamped together in filter presses facing each other to form filter chambers between adjacent filter plates and have at least one flexible filter wall at least locally deformable to effectively alter the volume of the filter chamber under the operation of a pressurizing means. The filter plate has a support, the support holds the filter wall, has at least one border or frame member attached to the support, and has a pressurizable chamber for the pressurizing medium which is formed between the filter wall and the support.

To attach the frame members the juxtaposed surfaces of both pieces turned toward each other are provided with a joint, which comprises at least one engaging strip having lateral projections as seen in a cross section taken perpendicular to the face of the filter plate, and a respective joint groove for receiving the strip in the other opposing surface which is undercut. An elastic seal sealing the frame members to the support extends along the entire periphery of the frame members.

In a filter plate of the above described kind as taught in German patent DE-OS 32 20 487 the filter wall and the plate frame or frame member are formed in a single piece, which substantially determines the choice of the material for the filter wall which is limited as a rule to polypropylene. About the filter wall on a frame member the innermost strip or rib of the joint is found in the transition region between the filter wall and the frame member so that there the support is pressed tightly to the frame member.

Of course in the open filter press with the closing pressure absent, the joint has in an engaged or joined position between the support and the frame member a gap, which introduces play into the engaged or joined position, which on closing of the filter press allows a pressing together of both pieces against the resistance of the seal provided with the strip of the joint. However this free play does not extend as far as is necessary to allow the seal produced by the seal to be broken, so that in an inadvertent opening of the filter press still under filter pressure this filter pressure can be reduced quickly enough inside of the pressurized chamber. The result of this kind of operating fault can be the destruction of the filter wall and an explosive pressure reduction with all its concomitant dangers.

OBJECTS OF THE INVENTION

Our invention is based on a desire to construct a filter plate of the foregoing kind so that on the one hand a satisfactory holding and sealing of the filter wall in the filter plate is guaranteed, but on the other hand the filter pressure in the pressurized chamber adjacent the filter wall can be released without danger and destruction, when the closing pressure of the filter press is reduced or released with the filter pressure still present, for example, when the filter press is inadvertently opened without previous reduction of the filter pressure.

It is thus the general object of our invention to provide an improved filter plate for a filter press.

It is also an object of our invention to provide a safer filter plate for a filter press.

It is another object of our invention to provide an improved filter plate for a filter press, in which a satisfactory seal of the filter wall in the filter plate exists during operation, but the filter pressure can be released without danger to the operator or destruction of equipment, when the filter press is inadvertently opened or the closing pressure is removed or let off.

SUMMARY OF THE INVENTION

These objects and others which will become apparent hereinafter are attained in accordance with our invention in a filter plate for a filter press, in which a plurality of filter plates are clamped together facing each other to form filter chambers between adjacent filter plates. On at least one side of the filter plate the filter plate supports a flexible filter wall at least locally deformable so as to protrude into the adjacent filter chamber, wherein the filter plate has a support, the support holds the filter wall, at least one frame member is attached to the support, and a pressurized chamber for a pressurizing medium is formed between the filter wall and the support.

For attachment of one of the frame members with the support a joint is provided on the opposing surfaces of the frame member and the support turned toward each other, the joint having at least one strip or rib on one of the opposing surfaces, the strip having at least one lateral projection thereon, and on another one of the opposing surfaces a joint groove, which receives and engages the strip in an engaged or joined position, the joint groove having an undercut for engaging one of the lateral projections. An elastic seal sealing each of the frame members to the support extends along the entire peripheral extent of the frame member.

According to the invention each of the filter walls is formed separately from the frame. member and is clamped edgewise (along its edge) in a clamping slot running peripherally between the support and one of the frame members, so that in a direction toward the outside, that is toward the outside edge of the filter plate, a sealing slot widening transversely to the plane of each of the frame members is connected to the clamping slot.

The filter wall with a projecting edge thereof overlapped by a shoulder of the support extends into the sealing slot. The filter wall has an annular flange directed toward the outside edge of the filter plate, which additionally has a seal composed of an elastic material which is received in the sealing slot and is provided with a U-shaped cross section having two inwardly directed arms, these arms embracing and sealing each side of the annular flange, and the seal presses on and seals the support on one side and one of the frame members on the other side thereof.

The spacing between the seal and the joint in the engaged or joined position is large enough so that upon relief of the closing pressure of the filter press, the frame member can be moved from the support without disengaging it sufficiently far in the vicinity of the sealing slot, so that the pressurized chamber is unsealed at the seal in the sealing slot.

In the filter plate accordng to our invention the clamping of the filter wall in the clamping slot and its projecting edge overlapped by the shoulder of the support and pressing against it ensures the secure holding of the filter wall between the support and the frame member. Of course the filter wall comprises an elastic, flexible material, like synthetic rubber or caoutchouc (natural rubber) in various grades. The seal results by the U-shaped seal lying in the sealing slot, which seals the support against the frame member and both of these against the filter wall lying between them, so that the sealing member effects a sealing of the pressurizable chamber.

The compression resistant seal results however only in the closed filter press, when the filter plates are clamped together face to face and hence the support and the frame member of each filter will lie firmly against each other so that the seal in the sealing slot can maintain the desired sealing pressure.

Without the closing pressure of the filter press, so that each of the frame members, both with the free play of the engaged position of the joint held on the support and to the extent of its own elastic deformability, in the vicinity of the sealing slot, is shifted away from the support so that the seal engaged in the sealing slot will be released. Thus the seal of the pressurized chamber created by it will be broken, and the press pressure in the pressurized chamber is relieved safely.

As a result because of our invention in the vicinity of the seal between the support and the edge of the filter wall an elasticity is provided, which with closing pressure removed will unseal the seat of the filter wall on the support and permits decrease of the press pressure in an innocuous and safe way. The danger of an explosion is therefore excluded.

In an advantageous additional feature of our invention the support bulges out in the vicinity of the frame members and the shoulder in the support is indented toward the inside of the support. Furthermore also according to the preferred embodiment of our invention the clamping slot is formed inside of a noselike projecting edge of the frame member, wherein a concave arched nose ridge turned away from the clamping slot blends into the outer facial front surfaces of the frame members and the nose root runs approximately flush with the beginning of the annular flange of the filter wall. This preferred feature is associated with the advantage that the frame member in the vicinity of its noselike projecting edge portion in the closed filter press, when the frame member of the adjacent filter plate is positioned so that their front surfaces press firmly on each other, can give way to the extent that the position of the frame member on the filter wall does not impair or injure the clamping and sealing directly between the support and the frame member.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
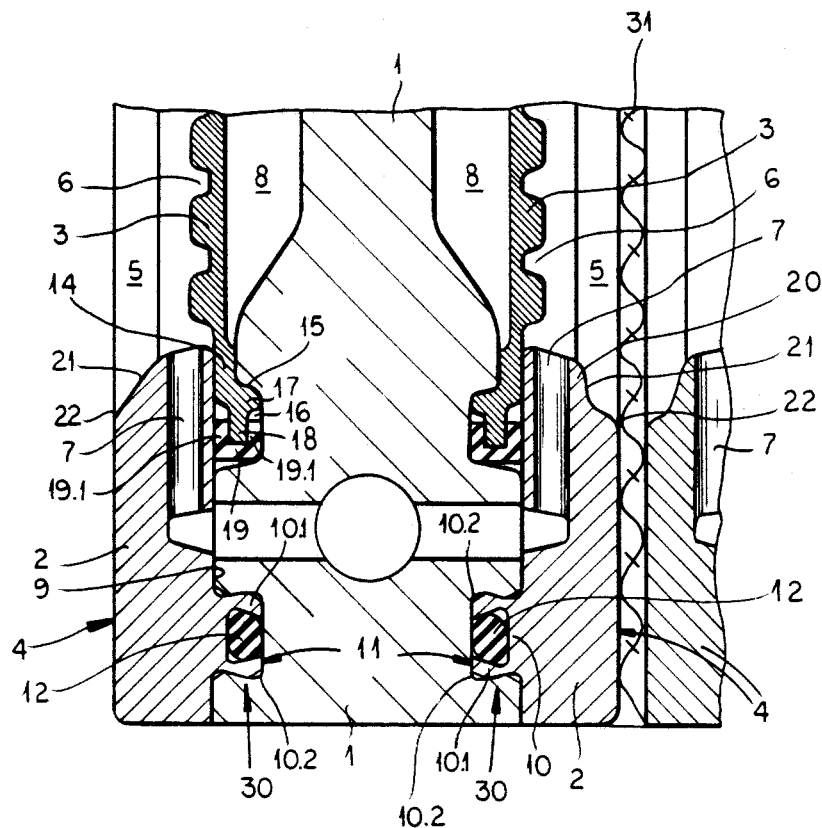
FIG. 1 is a partial section through an edge of a preferred embodiment of a filter plate according to our invention.
Figure 2:
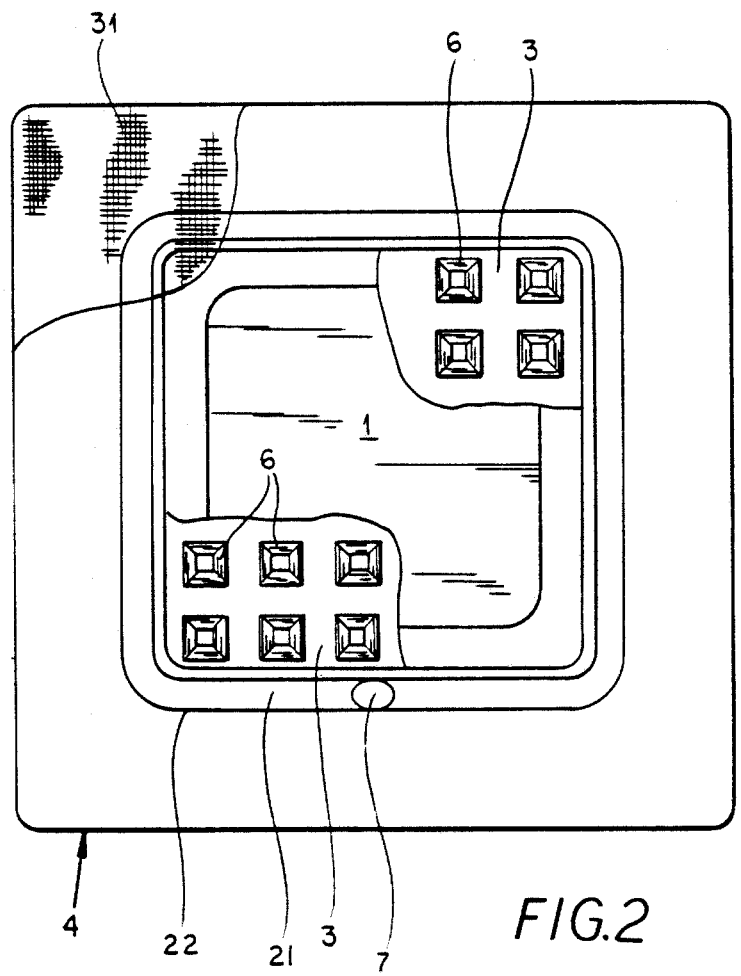
FIG. 2 is an elevational view of the plate to a reduced scale.

The filter plate shown in the drawing comprises a support 1, which is bulged out in the vicinity of its edge and there on each side has a frame member 2 and supports a filter wall.

The filter plate is arranged with several other filters (one additional such plate being partly shown in the right hand side of FIG. 1) in a filter press so that the frame members 2 of the neighboring filter plates lie next to each other with a cloth filter 31 interposed therebetween and are clamped against each other by the closing pressure of the filter press. Therefore the filter plates pairwise form a filter chamber 5 between themselves, in which the material to be filtered arrives through an unshown inlet.

The filtrate passing through the filter cloth, arrives at a section of filter wall 3 having the profile 6 shown in FIG. 1, (e.g. ribs as shown although pins can also be used) and from there it flows into the outlet 7.

During the filtering process a suitable pressurizing medium is furnished to the pressurized chamber 8 between the support 1 and the filter wall 3, under whose operation the filter wall 3 moves forward into the filter chamber 5 and thereby squeezes filter cakes formed in the filter chamber 5.

To secure each frame member 2 to the support 1 the opposing surfaces 9 turned toward each other of both pieces 1 and 2 are provided with a joint 30. This joint 30 comprises in this example a strip 10 having lateral projections 10.1 on frame member 2 and a joint groove 11 for receiving the strip 10 in the support 1 with the projections 10.1 being engaged in undercuts 10.2 recessed into the lateral walls or flanks of joint groove 11. In the strip or rib 10 an elastic seal 12 is inserted, which is pressed against the base of the joint groove 11, when the frame member 2 and support 1 are clamped together under the closing pressure of the filter press.

Each filter wall 3, formed separately from each frame member 2, is clamped between the support 1 and each frame member 2 edgewise in a clamping slot 14 running along its peripheral edge. To the clamping slot 14 a sealing slot 16 widened transverse to the plane of the frame member 2 is connected and positioned in a direction toward the outside of the filter plate in a shoulder 15.

The filter wall 3 extends a projecting edge 17 overlapped with the shoulder 15 into the sealing slot 16. The projecting edge 17 overlapped by the shoulder 15 presses on the shoulder 15 and thus the projecting edge 17 is prevented from slipping out through the clamping slot 14. In the embodiment shown the shoulder 15 is found on the support 1 and an indentation is made in shoulder 15 in the direction of the midplane of the support 1. The projecting edge 17 of the filter wall 3 has additionally an annular flange 18 directed toward the outside into the sealing slot 16. In the sealing slot 16 an elastic seal 19 with a U-shaped cross section has two inwardly directed arms 19.1, whose arms 19.1 surround and seal both sides of the annular flange 18.

The outside surfaces of elastic seal 19 on one side seal the frame member 2 and on the other side seal the support 1. Sealing slot 16 and seal 19 are so adapted to each other in regard to their opposing surface dimensions, that in the closed filter press, when also the frame member 2 and the support 1 press tightly on each other on opposing surfaces 9, a breakable seal of the support 1 against the frame member 2 and between the projecting edge 17 of the filter wall 3 on one side and the support 1 and the frame member 2 on the other side results.

However in removing the closing pressure the free play in the engaging direction of the strip piece 10 and the joint groove 11 is so large and the deformability of the frame member 2 in the region between the strip piece 10 and the clamping slot 14 is so large, that the frame member 2 in relieving or venting the closing pressure of the filter press, without disengaging from the support 1 can be moved so far that the bond of the seal 19 in the sealing slot 16 is broken, and the pressurizable chamber 8 is unsealed at the seal 19. Consequently the press pressure can be relieved or vented in a safe way.

Moreover the clamping slot 14 is formed inside a noselike projecting edge 20 of the frame member 2. The straight or concave arched nose ridge 21 turned away from the clamping slot 14 blends or merges with the outer front surface 4 of the frame member 2. The nose root 22 runs approximately flush with the beginning of the annular flange 18 to the filter wall 3. As a result of this projecting edge 20 the frame member 2 is braced also in the enclosed filter press likewise in the vicinity of the clamping slot 14 by the neighboring filter plate, so that it can be deformed slightly in the sense of a widening of the clamping slot 14 and the clamping of the filter wall 3 in the clamping slot 14 does not prevent the frame member 2 from lying flat under the operation of the closing force of the support 1.

We claim:
1. A filter press comprising a stack of filter assemblies and respective filter layers positioned between said assemblies, each of said assemblies comprising:
   a support plate (1) having a peripheal bulge formed along an inner part of said plate and on opposite sides thereof with sealing slots (16) opening in opposite directions;
   a respective flexible filter wall (3) lying along each side of said support plate (1) and defining with the support plate (1) inwardly of the respective sealing slot (16) a respective pressure chamber (8), each of said filter walls (3) having an annular flange (18) projecting away from said chamber;
   a unitary respective flange-type seal (19) enclosing by direct contact the respective flange (18), having respective lips (19.1) flanking opposite sides of said flange (18), and being disposed in the respective sealing slot (16); and
   a respective frame (2) separate from said plate (1) and said filter wall (3), overlying each side of said bulge and connected thereto by a sealing joint bridging directly confronting surfaces of each side of the bulge and a respective groove (11) formed in one of said surfaces and having undercut walls, and a respective rib (10) projecting from said other of said surfaces and diverging therefrom and receivable in said groove (11) to elastically lock therein, said frame (2) having an inwardly projecting plate portion distal from said joint (30) and overhanging said seal (19) and said slot to sealingly retain said flange and said seal (19) in said slot, said seal (19) being spaced from said joint (30) by a distance sufficient to ensure that the elasticity of said inwardly projecting plate portion will enable said inwardly projecting plate portion to deflect sufficiently upon release of a closing pressure on the filter press to enable relief of pressure from the respective pressure chamber past the respective seal (19).

2. The press defined in claim 1 wherein said filter walls are provided adjacent the respective flanges (18) with respective shoulders (15) extending into the respective slots (16).

3. The press defined in claim 1 wherein said respective groove (11) is formed in a surface of support plate (2).

* * * * *